United States Patent [19]
Gresh et al.

[11] Patent Number: 5,251,746
[45] Date of Patent: Oct. 12, 1993

[54] CONTAINER FOR CASSETTE, PRINT STACK, AND INDEX PRINT

[75] Inventors: Timothy F. Gresh, Canton; William H. Valls, Harwinton, both of Conn.

[73] Assignee: Eastman Kodak Company, Rochester, N.Y.

[21] Appl. No.: 3,336

[22] Filed: Jan. 12, 1993

[51] Int. Cl.⁵ .......................................... B65D 85/671
[52] U.S. Cl. ................................... 206/232; 206/225; 206/408; 206/450; 206/455; 206/472; 206/475; 281/31
[58] Field of Search .................... 40/124, 124.1, 124.2, 40/124.4, 152, 152.1, 157, 158.1, 159, 159.2; 206/0.8, 0.81–0.84, 45.34, 216, 223, 225, 232, 333, 387, 389, 391, 408, 409, 425, 444, 449, 450, 454–457, 459.5, 461–483, 559–565, 578, 581; 242/71, 71.1, 71.7; 281/21, 22, 26, 28, 31, 51; 434/429

[56] References Cited

U.S. PATENT DOCUMENTS

| | | | |
|---|---|---|---|
| 3,698,544 | 10/1972 | Growney | 206/45.14 |
| 3,708,061 | 1/1973 | Weingarden et al. | 206/45.34 |
| 4,171,050 | 10/1979 | Murray et al. | 206/463 |
| 4,518,275 | 5/1985 | Rauch, III et al. | 206/387 |
| 4,805,039 | 2/1989 | Otake et al. | 358/335 |
| 4,925,029 | 5/1990 | Friedman et al. | 206/473 |
| 4,966,285 | 10/1990 | Otake et al. | 206/455 |
| 4,998,361 | 3/1991 | Gordon | 40/152 |
| 5,161,907 | 11/1992 | Byrne | 40/159 |
| 5,190,129 | 3/1993 | Cummings | 40/159 |

FOREIGN PATENT DOCUMENTS

0375925  7/1990  European Pat. Off. ............ 206/456

Primary Examiner—Jimmy G. Foster
Attorney, Agent, or Firm—Roger A. Fields

[57] ABSTRACT

A container is disclosed for a cassette housing an image bearing medium having recorded images, for a stack of photographic picture prints made from the recorded images, and for an index print having rows of small-size positive images that match the recorded images. The container comprises a book-like jacket including a pair of leaves separated by a spine joined to the leaves at respective fold lines to permit the leaves to be arranged opposing each other. At least one of the leaves is photographic paper to permit the index print to be formed directly on that leaf. The spine is wide enough to permit the stack of photographic picture prints to be stored between the leaves when the leaves oppose each other. An openable pocket web joined to the leaves across the spine is opened to receive the cassette when the leaves oppose each other. A storage sheath with a window for viewing the index print is adapted to receive the jacket with its leaves opposing each other.

5 Claims, 2 Drawing Sheets

CONTAINER FOR CASSETTE, PRINT STACK, AND INDEX PRINT

CROSS-REFERENCE TO RELATED APPLICATION

Reference is made to commonly assigned copending application Ser. No. 08/003,364, entitled CONTAINER FOR INDEX PRINT SHEET AND CASSETTE, and filed Jan. 12, 1992 in the name of R. J. Blackman.

BACKGROUND OF THE INVENTION

1. Field of the Invention

The invention relates to a container for a cassette housing an image bearing medium having recorded images, for a stack of photographic picture prints made from the recorded images, and for an index print having rows of small-size positive images that match the recorded images.

2. Description of the Prior Art

Generally, a processing laboratory gives the customer a processed photographic negative film and photographic picture prints which are copied and enlarged from the film. The negative film is usually cut into several sections, each one containing the same number of negatives and inserted in an open-ended sheath or sleeve. Many customers store the picture prints in an envelope (with the negatives), making it difficult to later find a particular print.

Index or contact print sheets have been proposed which make it easier to find a particular negative. An index print sheet has printed on it several parallel rows of small-size positive images that match the negatives. The positive images are numbered in accordance with numbering of the negatives.

A book-like container for the index print sheet, the negatives, and a stack of picture prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the image portion of the index print sheet along a mid-line. This flexing can possibly damage the image portion. The cassette is stored in an interior pocket raised from the base. This arrangement makes the container rather bulky.

The Cross-Referenced Application

Cross-referenced application Ser. No. 08/003,364 discloses a container for a cassette which holds an image bearing medium having recorded images and for an index print sheet which has printed pictures that match the plurality of images on the image bearing medium. The container comprises a transparent sheet-like cover having a length and width slightly larger than corresponding dimensions of the index print sheet to closely overlay the index print sheet, and a sheet-like back having a length and width similar to the length and width of the cover to store the index print snugly between the cover and the back with the plurality of pictures on the index print sheet visible through the cover. The back includes an integrally formed nest blown outward to hold the cassette out of the way of the index print sheet.

SUMMARY OF THE INVENTION

A container for a cassette housing an image bearing medium having recorded images, for a stack of photographic picture prints made from the recorded images, and for an index print having rows of small-size positive images that match the recorded images, comprises:

a book-like jacket including a pair of leaves separated by a spine joined to the leaves at respective fold lines to permit the leaves to be arranged opposing each other, at least one of the leaves being dimensioned to bear the index print, and the spine being wide enough to permit the stack of photographic picture prints to be stored between the leaves when the leaves oppose each other; and openable pocket means joined to the leaves across the spine to open to receive the cassette when the leaves oppose each other.

Preferably, the leave(s) to bear the index print is photographic paper to permit the index print to be formed directly on the leave(s).

Also, a storage sleeve may be provided to receive the jacket with its leaves opposing each other. The storage sleeve has one or more windows for viewing the leave(s) with the index print(s).

DETAILED DESCRIPTION OF THE PREFERRED EMBODIMENT

Figure 2:
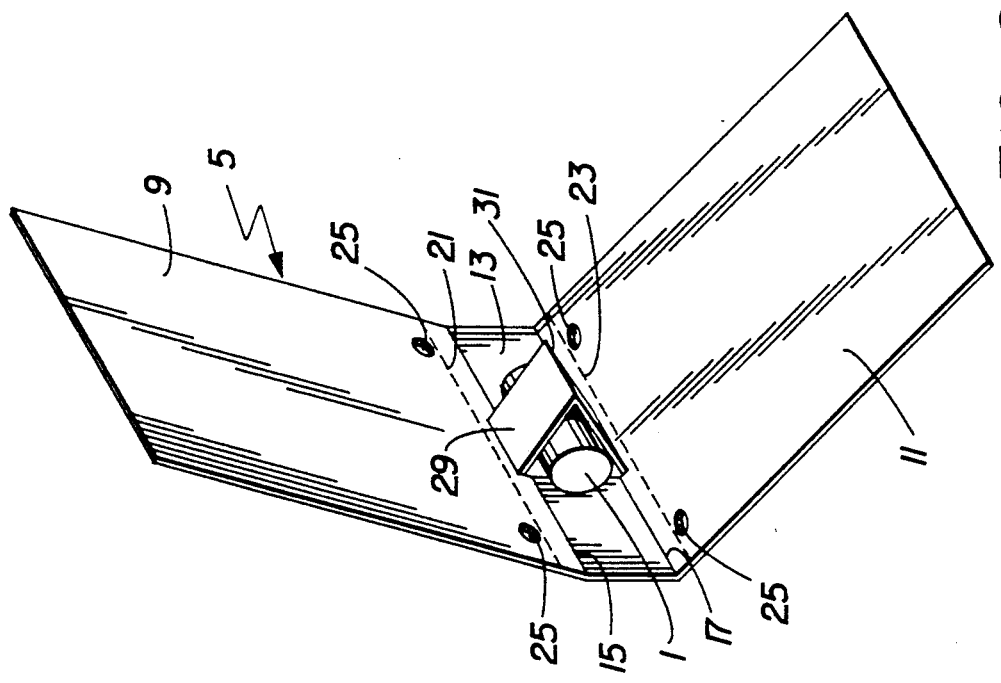
FIG. 2 is a perspective view of the jacket showing its inside.

Referring to FIG. 2, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 houses a rolled filmstrip, not shown, having a series of successively numbered conventional negatives.

Figure 1:
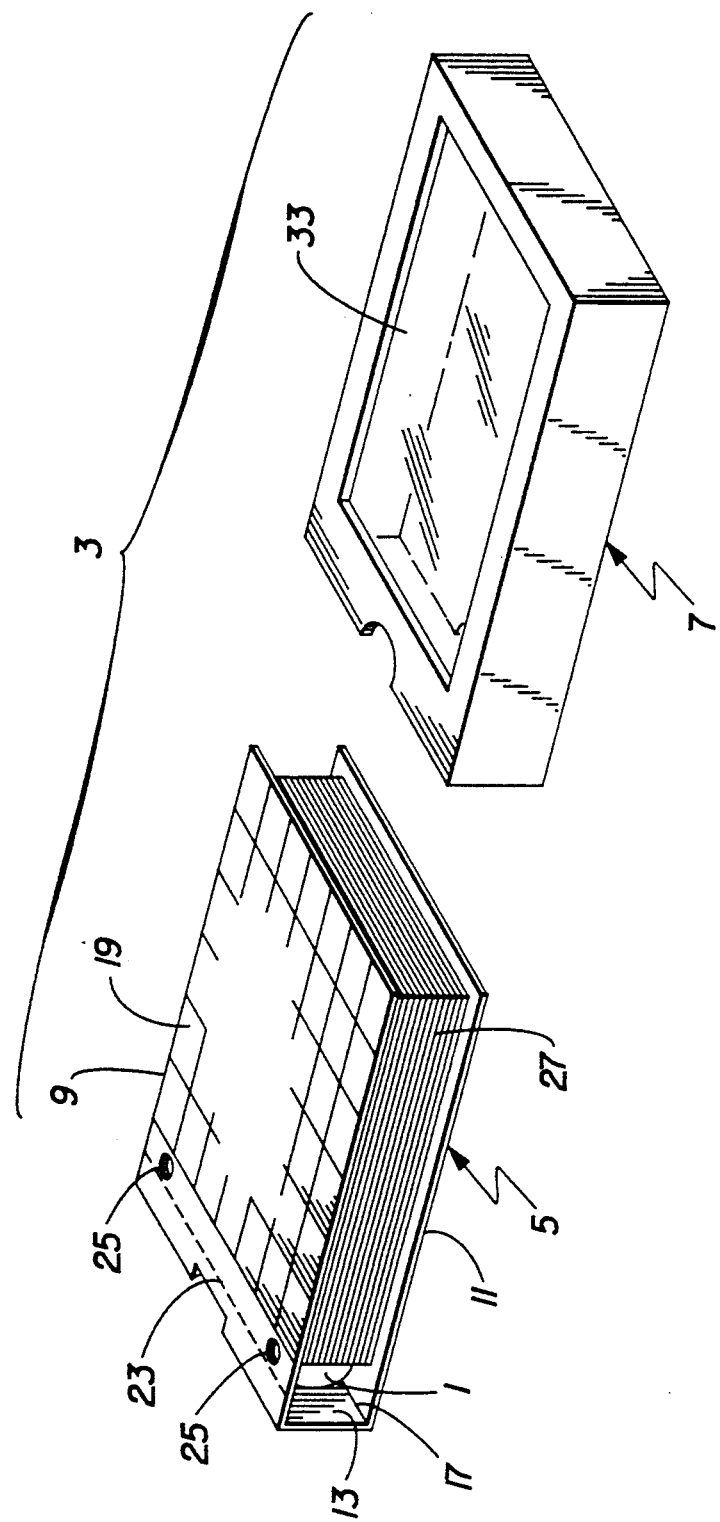
FIG. 1 is a perspective view of a container comprising a book-like jacket and a sheath for the jacket according to a preferred embodiment of the invention.

A container 3, shown in FIG. 1, comprises a book-like jacket 5 and a storage sheath 7 for the jacket.

Figure 3:
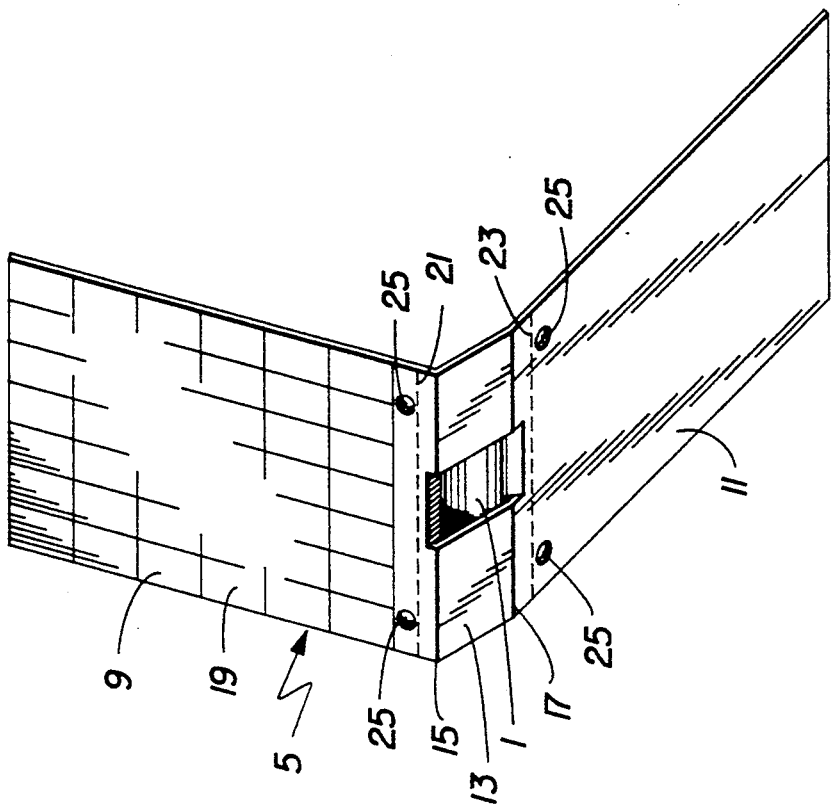
FIG. 3 is a perspective view of the jacket showing its outside.

The jacket 5 includes a front leave 9 and a back leave 11 separated by an integral spine 13 joined to the two leaves at respective fold or crease lines 15 and 17 to permit the leaves to be arranged opposing each other. See FIGS. 1-3. The front and back leaves 9 and 11 and the spine 13 are a single piece of photographic paper which permits an index print 19 to be formed directly on at least one of the leaves, preferably the front leave, as shown in FIGS. 1 and 3. Alternatively, the index print 19 can be pasted as a sheet to the front leave 9, in which instance the front leave would not be photographic paper. The index print 19 is similar to the one disclosed in U.S. Pat. No. 4,966,285, issued Oct. 30, 1990, and has printed on it several parallel rows of small-size positive images that match the negatives inside the cassette 1. The positive images are numbered in accordance with numbering of the negatives. The front and rear leaves 9 and 11 have respective tear lines 21 and 23 to optionally disconnect whichever of the two leaves that bear the index print 19 from the spine 13, and they each have a pair of holes 25 to secure the disconnected leave(s) in a two-ring binder, not shown. The spine 13 is wide enough to permit a stack of conventional photographic picture prints 27 made from the negatives to be stored between the leaves 9 and 11 as shown in FIG. 1. A pocket web 29 is joined to the front and rear leaves 9 and 11 across the spine 13 as shown in FIG. 1. The pocket web 29 has a fold or crease line 31 which enables the pocket web to back away from the spine 13 at the fold line to open to receive the cassette 1 when the front and rear leaves oppose each other.

The storage sheath 7 is dimensioned to receive the jacket 5 with its leaves 9 and 11 opposing each other as shown in FIG. 1. The storage sheath 7 has at least one window 33 for viewing the index print 19.

The invention has been described with reference to a preferred embodiment. However, it will be appreciated that variations and modifications can be effected within the ordinary skill in the art without departing from the scope of the invention.

We claim:

1. A container for a cassette housing an image bearing medium having recorded images, for a stack of photographic picture prints made form the recorded images, and for an index print having rows of small-size positive images that match the recorded images, said container comprising:

a book-like jacket including a pair of leaves separated by a spine joined to said leaves at respective fold lines to permit the leaves to be arranged opposing each other, at least one of said leaves being dimensioned to bear the index print, and said spine being wide enough to permit the stack of photographic picture prints to be stored between said leaves when the leaves oppose each other; and openable pocket means joined to said leaves across said spine to open to receive the cassette when the leaves oppose each other.

2. A container as recited in claim 1, wherein said one of the leaves to bear the index print is photographic paper to permit the index print to be formed directly on the one leave.

3. A container as recited in claim 1, further comprising:

a storage sleeve dimensioned to receive said jacket with its leaves opposing each other, said storage sleeve having a window for viewing said one of the leaves to bear the index print to see the index print.

4. A container as recited in claim 1, wherein said one of the leaves to bear the index print has a tear line to disconnect the one leave from said jacket.

5. A container as recited in claim 1, wherein said leaves and said spine are a single piece of photographic paper to permit the index print to be formed directly on at least one of the leaves.

* * * * *